US012809440B2

(12) United States Patent
Klein et al.

(10) Patent No.: US 12,809,440 B2
(45) Date of Patent: Nov. 24, 2026

(54) SYSTEMS AND METHODS FOR APPLYING ASYMMETRIC INPUT CURRENT LIMITS IN REDUNDANT POWER DISTRIBUTION SYSTEMS

(71) Applicant: Dell Products L.P., Round Rock, TX (US)

(72) Inventors: Craig Anthony Klein, Elgin, TX (US); Douglas E. Messick, Austin, TX (US); Wayne Kenneth Cook, Round Rock, TX (US); John Erven Jenne, Georgetown, TX (US); Kyle E. Cross, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/020,749

(22) Filed: Jan. 14, 2025

(65) Prior Publication Data

US 2026/0202897 A1 Jul. 16, 2026

(51) Int. Cl.

| | |
|---|---|
| ***G06F 11/00*** | (2006.01) |
| ***G06F 1/28*** | (2006.01) |
| ***G06F 1/30*** | (2006.01) |
| ***G06F 11/16*** | (2006.01) |

(52) U.S. Cl.
CPC .................. *G06F 1/30* (2013.01); *G06F 1/28* (2013.01); *G06F 11/16* (2013.01)

(58) Field of Classification Search
CPC ............... G06F 1/28; G06F 1/30; G06F 11/16
See application file for complete search history.

(56) References Cited

U.S. PATENT DOCUMENTS 10,886,776 B1 * 1/2021 Dias .......................... G06F 1/26
2007/0079170 A1 * 4/2007 Zimmer ................ G06F 11/008 714/6.23
2012/0151248 A1 * 6/2012 Bower, III ............ G06F 1/3203 714/E11.073
2015/0121113 A1 * 4/2015 Ramamurthy .......... H02J 9/061 713/340
2018/0267585 A1 * 9/2018 Allen-Ware .......... G06F 1/3296
2023/0315183 A1 * 10/2023 Messick ................ G06F 1/3287 713/340
2025/0321814 A1 * 10/2025 Werner ............... G06F 11/3058
2026/0039140 A1 * 2/2026 Lin ......................... H02J 9/005

* cited by examiner

*Primary Examiner* — Marc Duncan
*Assistant Examiner* — Gabriella Kanani Shelton
(74) *Attorney, Agent, or Firm* — Fogarty LLP

(57) ABSTRACT

Systems and methods for applying asymmetric Input Current Limits in redundant power distribution systems are described. In an illustrative, non-limiting embodiment, an Information Handling System (IHS) may include a processor and a memory coupled to the processor, the memory having program instructions stored thereon that, upon execution, cause the IHS to: detect a second power supply unit (PSU) fault in a server, the server having a first PSU coupled to a first grid and the second PSU coupled to a second grid; and in response to the detection, allocate stranded power from the second grid to the first PSU following an asymmetric Input Current Limit (ICL) setting associated with the server.

20 Claims, 10 Drawing Sheets

400

500

900

600

800

1000

1100

SYSTEMS AND METHODS FOR APPLYING ASYMMETRIC INPUT CURRENT LIMITS IN REDUNDANT POWER DISTRIBUTION SYSTEMS

FIELD

This disclosure relates generally to Information Handling Systems (IHSs), and more specifically, to systems and methods for applying asymmetric Input Current Limits in redundant power distribution systems.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for applying asymmetric Input Current Limits in redundant power distribution systems are described. In an illustrative, non-limiting embodiment, an Information Handling System (IHS) may include a processor and a memory coupled to the processor, the memory having program instructions stored thereon that, upon execution, cause the IHS to: detect a second power supply unit (PSU) fault in a server, the server having a first PSU coupled to a first grid and the second PSU coupled to a second grid; and in response to the detection, allocate stranded power from the second grid to the first PSU following an asymmetric Input Current Limit (ICL) setting associated with the server In some cases, prior to the detection, the first and second PSUs may operate subject to symmetric load balancing. The asymmetric ICL setting may include an ICL ratio. The stranded power may include power available in the second grid and not consumed by the second PSU.

To allocate the stranded power, the program instructions, upon execution, may cause the IHS to modify power delivered to another server having another first PSU coupled to the first grid and another second PSU coupled to the second grid. For example, the program instructions, upon execution, may cause the IHS to reduce power delivered to the another first PSU and increase power delivered to the another second PSU following another asymmetric ICL setting associated with the other server.

In some cases, the program instructions, upon execution, may cause the IHS to determine that: (a) the server has received a new second PSU, or (b) the server has been replaced by a new server, where the new server comprises a new first PSU and the new second PSU. The program instructions, upon execution, may cause the IHS to prevent the new second PSU from receiving power from the second grid until the IHS reduces power delivered via the first grid to the first PSU or the first new PSU.

Additionally, or alternatively, the program instructions, upon execution, may cause the IHS to throttle the server. Additionally, or alternatively, the program instructions, upon execution, cause the IHS to prevent the new second PSU from receiving power from the first grid until the other server is set to symmetric load balancing.

In another illustrative, non-limiting embodiment, a method may include: delivering power to a server having a first PSU coupled to a first grid and a second PSU coupled to a second grid, the first and second PSUs subject to symmetric load balancing; detecting a failure of the second PSU; and in response to failure, allocating stranded power from the second grid to the first PSU following an asymmetric ICL setting.

Allocating the stranded power may include reducing power delivered to another first PSU and increasing power delivered to another second PSU of another server, where the another first PSU is coupled to the first grid and the another second PSU is coupled to the second grid. The method may also include: determining that: (a) the server has received a new second PSU, or (b) the server has been replaced by a new server, where the new server comprises a new first PSU and the new second PSU; and preventing the new second PSU from receiving power from the second grid until the IHS reduces power delivered via the first grid to the another first PSU or the new PSU. The method may include throttling the server. The method may also include preventing the replacement PSU or the new PSU to receive power from the first grid until the other server returns to the symmetric load balancing.

In yet another illustrative, non-limiting embodiment, a hardware memory device may have program instructions stored thereon that, upon execution by a processor of an IHS, cause the IHS to: deliver power to a server having a first PSU coupled to a first grid and a second PSU coupled to a second grid, the first and second PSUs subject to symmetric load balancing; detect a failure of the second PSU; and in response to failure, allocate stranded power from the second grid to the first PSU following an asymmetric ICL setting.

To allocate the stranded power, the program instructions, upon execution, may cause the IHS to reduce power delivered to another first PSU and increasing power delivered to another second PSU of another server, where the another first PSU is coupled to the first grid and the another second PSU is coupled to the second grid. The program instructions, upon execution, may also cause the IHS to: determine that: (a) the server has received a new second PSU, or (b) the server has been replaced by a new server, where the new server comprises a new first PSU and the new second PSU; and prevent the new second PSU from receiving power from the second grid until the IHS reduces power delivered via the first grid to the another first PSU or the new PSU.

In some cases, the program instructions, upon execution, may cause the IHS to throttle the server. The program instructions, upon execution, may also cause the IHS to prevent the replacement PSU or the new PSU to receive power from the first grid until the other server returns to the symmetric load balancing.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
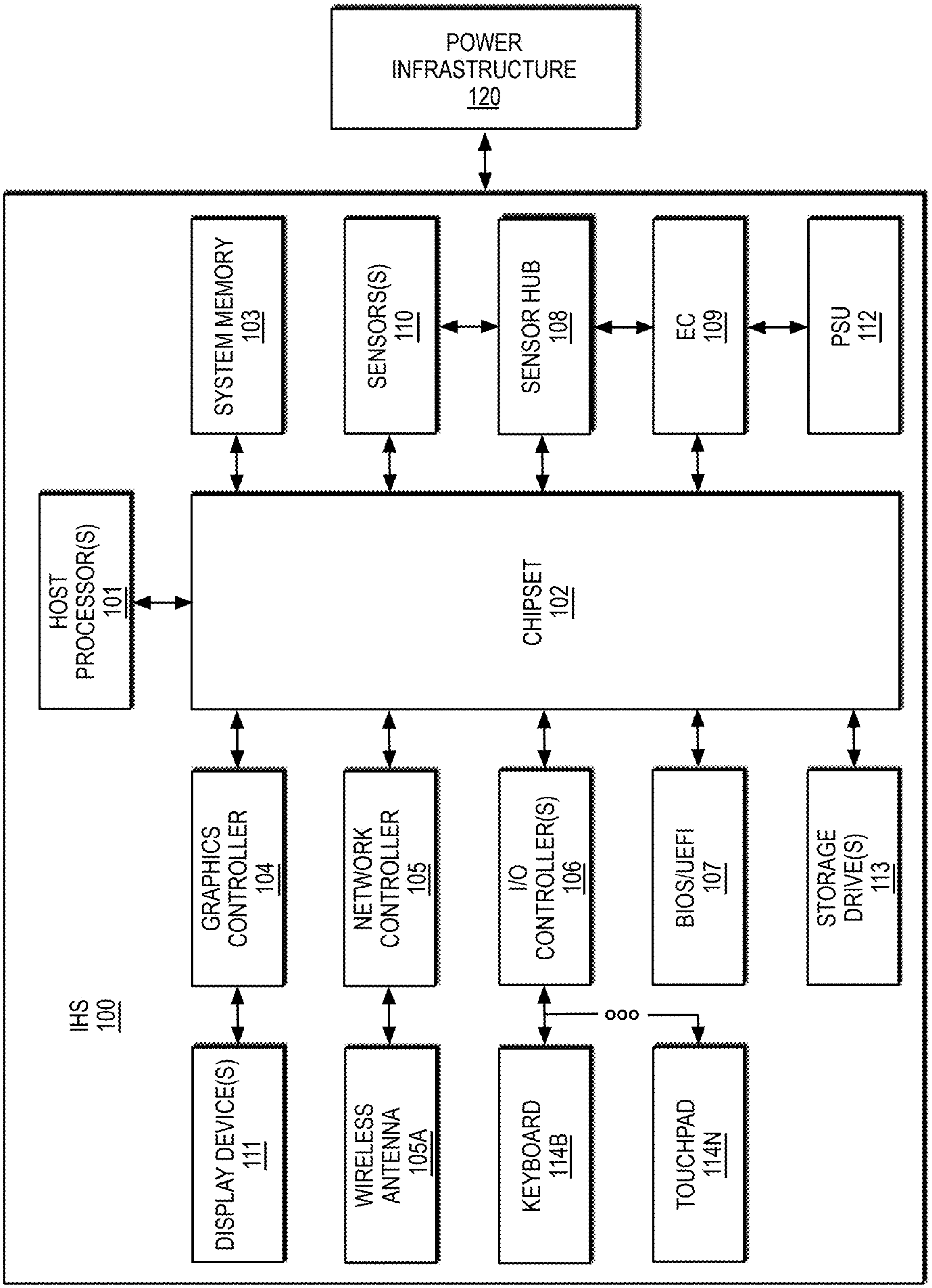
FIG. 1 is a diagram illustrating examples of components of an Information Handling System (IHS), according to some embodiments.

Data centers often implement power distribution redundancy to ensure continuous operation and reliability. This redundancy typically involves deploying multiple Power Supply Units (PSUs) in servers and Power Distribution Units (PDUs) connected to these PSUs. These power distribution paths are often referred to as "Grid A" and "Grid B;" even if the data center does not have redundant feeds from different utilities or grids.

Servers with multiple PSUs support a load balancing feature where the load/output is evenly distributed across each PSU. This setup aims to protect upstream circuit breakers and maintain system stability. In power-constrained environments, a failure in one of the server's PSUs can trigger Input Current Limit (ICL) protections, leading to system throttling to stay within the set limits. While there is available power to minimize throttling, existing systems lack a feature to utilize this stranded power effectively. This often results in underutilization of available power resources, leading to inefficiencies and potential performance degradation.

Current solutions for managing power distribution in data centers have several shortcomings. When a PSU fails, the system's load transitions to the remaining PSU, often triggering ICL protections and causing the system to throttle. This throttling can lead to significant performance impact, as the system operates at reduced capacity until the failed PSU is replaced. Additionally, the redundant PDU connected to the failed PSU may have available capacity that remains unused, further exacerbating the inefficiency. The lack of a mechanism to dynamically adjust power distribution and utilize stranded power limits the overall effectiveness of current power management systems.

To address these, and other concerns, systems and methods discussed herein may enable asymmetric PSU current sharing. This approach allows a first grid with a higher input current limit to provide more power than a second grid with a lower input current limit. By implementing a closed-loop algorithm, these systems and methods may dynamically adjust PSU load sharing to operate at their independent ICL limits, maximizing the utilization of available power without exceeding the set limits.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various Input/Output (I/O) devices, such as a keyboard, a mouse, touch screen, and/or a video display. An IHS may also include one or more buses operable to transmit communications between the various hardware components.

FIG. 1 is a diagram illustrating examples of components of IHS 100 configured according to some embodiments. As shown, IHS 100 includes host processor(s) 101. In various embodiments, IHS 100 may be a single-processor system, a multi-processor system including two or more processors and/or processor cores. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.). IHS 100 utilizes a chipset 102 that may include one or more integrated circuits that are connected to processor(s) 101. In the embodiment of FIG. 1, processor(s) 101 is depicted as a separate component from chipset 102. In other embodiments, chipset 102, or portions of chipset 102 may be implemented directly within the integrated circuitry of processor(s) 101. Chipset 102 provides processor(s) 101 with access to a variety of resources of the IHS.

In some embodiments, processor 101 may include an integrated memory controller that may be implemented directly within the circuitry of processor 101, or the memory controller may be a separate integrated circuit that is located on the same die as processor(s) 101. The memory controller may be configured to manage the transfer of data to and from the system memory 103 of the IHS 100 via a high-speed memory interface. System memory 103 provides processor (s) 101 with a high-speed memory that may be used in the execution of computer program instructions by processor(s) 101.

Accordingly, system memory 103 may include memory components, such as static RAM (SRAM), dynamic RAM (DRAM), NAND Flash memory, suitable for supporting high-speed memory operations by processor(s). In certain embodiments, system memory 103 may combine both persistent, non-volatile memory and volatile memory. In certain embodiments, system memory 103 may be comprised of multiple removable memory modules.

As illustrated, a variety of resources may be coupled to processor(s) 101 through chipset 102. For instance, chipset 102 may be coupled to a wireless network controller 105 that may support different types of wireless network connectivity. In certain embodiments, wireless network controller 105 may include one or more Network Interface Controllers (NICs). For example, wireless network controller 105 may implement hardware for communicating via specific networking technology, such as Wi-Fi, BLUETOOTH, and mobile cellular networks (e.g., CDMA, TDMA, LTE). In some embodiments, network controller 105 may support wireless Wi-Fi communications, and may include a Wi-Fi controller or wireless NIC card by which IHS 100 transmits and receives wireless Wi-Fi signals. In some embodiments, the wireless signaling utilized by wireless network controller 105 may be implemented using multiple wireless antenna 105*a*.

Chipset 102 also provides processor(s) 101 with access to one or more storage drives 113. In various embodiments, storage drives 113 may be integral to HIS 100 or may be external to IHS 100. In some embodiments, storage drive(s) 113 may be accessed via a storage controller that may be an integrated component of the storage device. In some embodiments, a storage controller may be a system-on-chip function of processor(s) 101. Storage drive(s) 113 may be implemented using any memory technology allowing IHS 100 to store and retrieve data. For instance, storage drive(s) 113 may be a magnetic hard disk storage drive or a solid-state storage drive. In certain embodiments, storage drive(s) 113 may include a system of storage devices, such as a cloud drive accessible via network interface 105.

As illustrated, IHS 100 also includes BIOS (Basic Input/Output System) 107 that may be stored in a non-volatile memory accessible by chipset 102. In some embodiments, BIOS 107 may be implemented using a dedicated microcontroller coupled to the motherboard of IHS 100. In some embodiments, BIOS 107 may be implemented as operations of embedded controller 109. Upon powering or restarting IHS 100, processor(s) 101 may utilize BIOS 107 instructions to initialize and test hardware components coupled to IHS 100.

BIOS 107 instructions may also load a host Operating System (OS) for use by IHS 100. BIOS 107 provides an abstraction layer that allows the OS to interface with certain hardware components of IHS 100. The Unified Extensible Firmware Interface (UEFI) was designed as a successor to BIOS. As a result, many IHSs utilize UEFI in addition to or instead of a BIOS. As used herein, BIOS is intended to also encompass UEFI.

As described, one or more display devices 111 may be coupled to IHS 100. Display device(s) 111 may include a plurality of pixels that are arranged in a matrix and are configured to display visual information. Display device(s) 111 may include Liquid Crystal Display (LCD), Light Emitting Diode (LED), organic LED (OLED), or other thin-film display technologies.

In some embodiments, one or more display devices 111 may be capable of receiving touch inputs from a user. In some embodiments, these touch inputs received via display devices 111 may be processed by a touch controller that may be separate from other controllers used to display content. In some embodiments, the touch controller functions may be implemented by a display controller.

Chipset 102 may operate one or more display device(s) 111 via graphics processor and/or Graphics Processor Unit (GPU) 104. In some embodiments, graphics processor 104 may be disposed within a video or graphics card or within an embedded controller installed in IHS 100. For instance, graphics processor 104 may be integrated within processor (s) 101, such as a component of a system-on-chip.

Chipset 102 may also provide access to one or more user input devices, in some instances using one or more I/O controller(s) 106 or the like. Examples of user input devices include but are not limited to a touchpad (such as a touchpad integrated in the palm rest area of a laptop IHS), keyboard 114B, and mouse 114C. In some embodiments, other user input devices supported through the operation of I/O controller(s) 106 may include a stylus, microphone(s), and camera(s).

Some IHSs 100 may utilize an Embedded Controller (EC) 109 or Baseboard Management Controller (BMC) that may be a motherboard component of IHS 100 and may include one or more logic units. In certain embodiments, EC or BMC 109 may operate from a separate power plane from processor(s) 101. Firmware instructions utilized by EC or BMC 109 may be used to operate a secure execution environment that may include operations for providing various core functions of IHS 100, such as power management and management of certain operating modes of IHS 100.

For instance, EC or BMC 109 may implement operations for interfacing with a power supply unit (PSU) 112 in managing power for IHS 100. In certain instances, EC or BMC 109 may be configured to set and/or enforce input current limits, current sharing ratios, load balancing parameters, etc. with respect to PSU 112 and/or other PSUs. For example, as discussed in more detail below, in some cases PSU 112 may include at least two PSUs, sometimes referred to as redundant PSUs, and each PSU may be configured to receive power from a distinct or independent grid or power distribution path/unit (PDU).

IHS 100 may include a wide variety of sensors 110 for use in gathering telemetry data that can be used in the management of the IHS's operations. Sensors 110 may be disposed on or within the chassis of IHS 100, and may include, but are not limited to: current, voltage, power, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s). Sensors 110 may include geo-location sensors, such as a GPS sensor or other location sensors configured to determine the location of IHS 100 based on triangulation and network information. Various sensors, such as optical, infrared and sonar sensors, may be used in the detection of individuals in proximity to the IHS 100 and/or in other forms of user presence detection.

Continuing with FIG. 1, IHS 100 (e.g., a server, storage device, networking device, IT equipment, etc.) receives power from power infrastructure 120. Power infrastructure 120 may be designed and controlled, such as illustrated below with respect to FIGS. 2-11.

In some embodiments, IHS 100 may not include all components shown in FIG. 1. In other embodiments, IHS 100 may include other components in addition to those shown in FIG. 1. Furthermore, components illustrated as separate components in FIG. 1 may instead be integrated with other components, such that all or a portion of the operations executed by such components may instead be executed by the integrated component.

Figure 2:
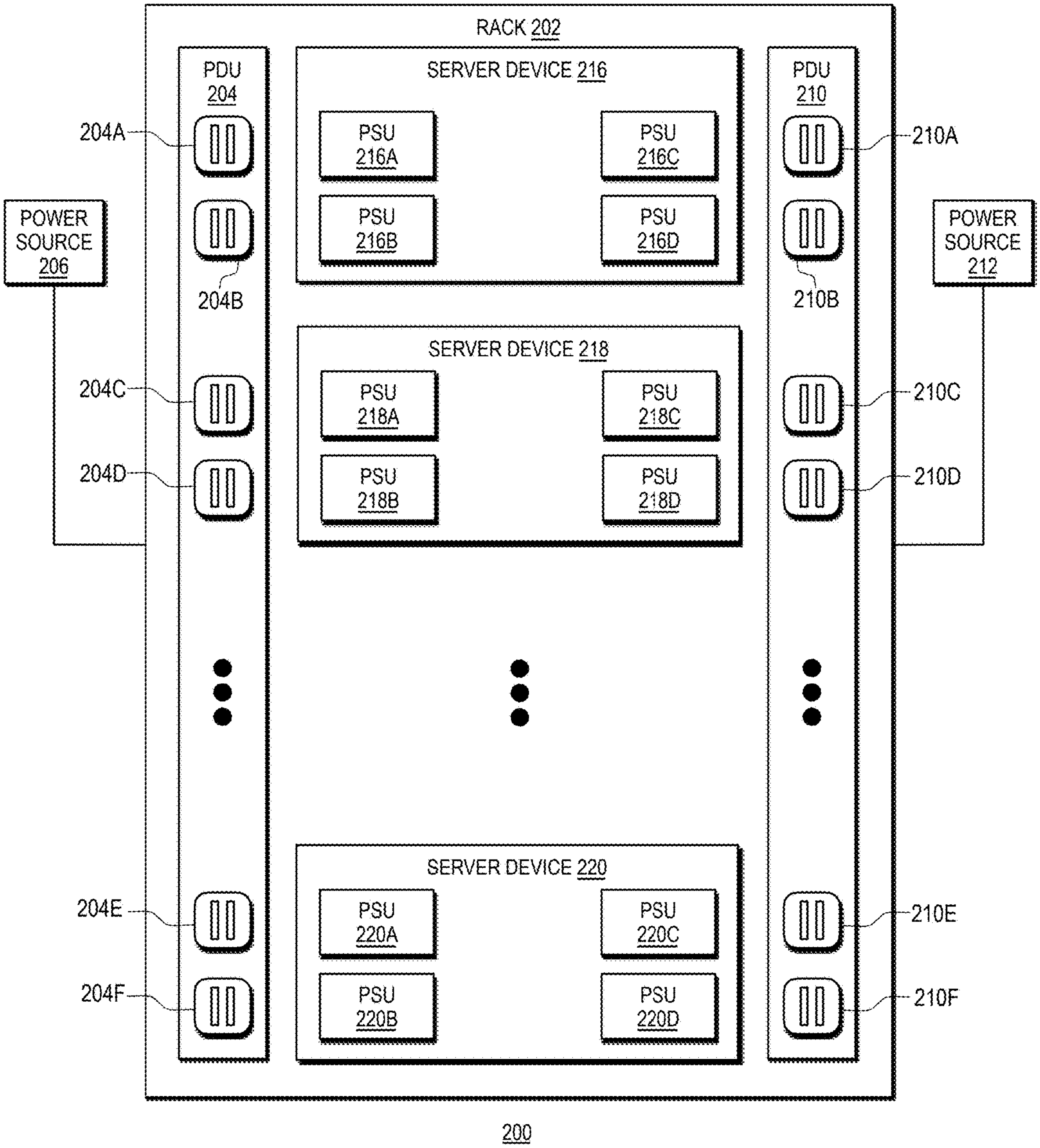
FIG. 2 is a diagram illustrating an example of a power management system, according to various embodiments.

Referring now to FIG. 2, an embodiment of power management system 200 is illustrated. The various power sources, power distribution units, and PSUs of FIG. 2 are an example of the power infrastructure 120 of FIG. 1. In this implementation, power management system 200 includes rack 202 that, in the examples provided below, is a server rack that is used to house a plurality of server devices. In other embodiments, however, rack 202 may be omitted, used to house other types of devices.

Rack 202 includes PDU 204 coupled to power source 206. Rack 202 also includes PDU 210, which is coupled to power source 212. Power sources 206 and 208 may be the same or different and may be connected to a local power utility company, on-site generator, or other appropriate utility.

As shown, rack 202 includes a plurality of server devices 216, 218, and up to 220, any or all of which may be provided by IHS 100, and/or that may include any or all components of IHS 100. Each of the plurality of server devices 216-220 includes: a plurality of PSUs 216A-D included in server device 216; another plurality of PSUs 218A-D included in server device 218; and yet another plurality of PSUs 220A-D included in server device 220.

PSUs 216A and 216B in server device 216 are connected to PDU 204 via respective power connections 204A and 204B; PSUs 218A and 218B in server device 218 are connected PDU 204 via respective power connections 204C and 204D; and PSUs 220A and 220B in server device 220 are connected PDU 204 via respective power connections 204E and 204F.

Similarly, PSUs 216C and 216D in server device 216 are connected to PDU 210 via respective power connections 210A and 210B; PSUs 218C and 218D in server device 218 are connected to PDU 210 via respective power connections 210C and 210D, and PSUs 220C and 220D in server device 220 are connected PDU 210 via respective power connections 210E and 210F.

While a specific power management system 200 is illustrated and described herein, a wide variety of modifications to power management system 200 illustrated in FIG. 2 fall within the scope of the present disclosure, including different numbers of power sources and/or PDUs providing power to server devices 216-220, different numbers of PSUs provided in server devices 216-220, etc.

In some cases, PSU 216A and PSU 216B may be configured in a load sharing arrangement in which each one of PSU 216A and PSU 216B is configured to output a same amount of power to a load in server device 216. The same may be true of the other paired PSUs in server device 216 and in the other server devices 218-220.

Figure 3:
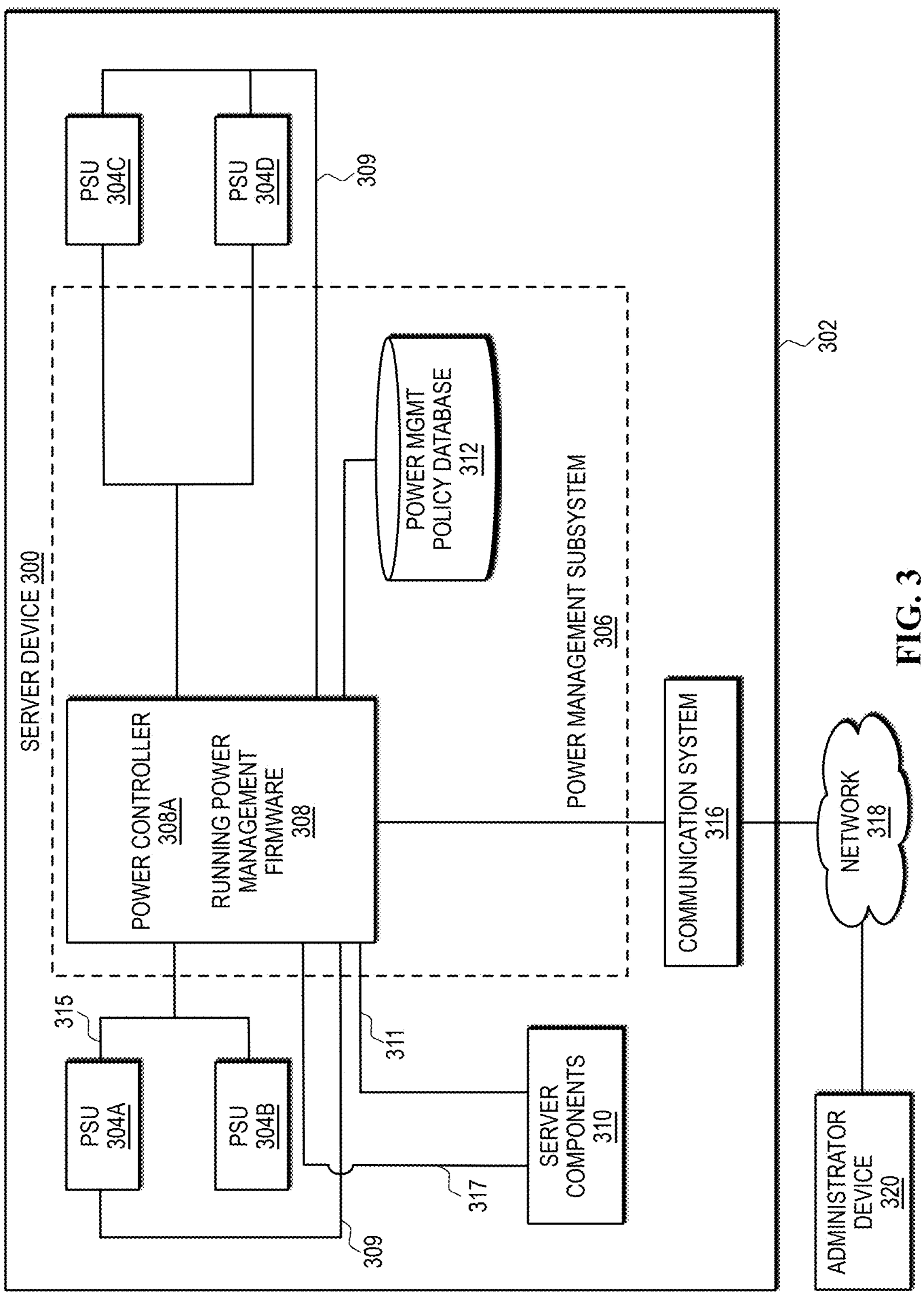
FIG. 3 is a diagram illustrating an example of a server device, according to various embodiments.

Referring now to FIG. 3, an embodiment of a server device 300 that may be utilized in power management system 200 is illustrated. Server device 300 may be provided as any or all server devices 216-220 discussed above with reference to FIG. 2 and, it may be implemented by the IHS 100 discussed above with reference to FIG. 1, and/or may include some or all the components of the IHS 100. Furthermore, as also discussed above with regard to server devices 216-220, server device 300 may be replaced with networking devices, storage devices, and/or other computing devices.

In the illustrated embodiment, server device 300 includes chassis 302 that houses the components of server device 300. For example, chassis 302 houses PSUs 304A-D, which in the examples below may correspond to the PSUs 216A-D included in server device 216, respectively; PSUs 218A-D included in server device 218, respectively; and/or PSUs 220A-D included in server device 220, respectively. As such, PSUs 304A and 304B may be coupled to the power source 206, and PSUs 340C and 304D may be coupled to power source 212.

Chassis 302 also houses power management subsystem 306 that, in the illustrated embodiment, includes power controller 308A running power management firmware 308. For example, power controller 308A may be provided on a BMC such as, for example, the integrated DELL® Remote Access Controller (IDRAC) available from DELL® Inc. of Round Rock, Texas, United States. However, other components may be utilized to provide the functionality of the power management firmware 308 and power management subsystem 306 discussed below.

In the examples discussed, power management firmware 308 is configured (e.g., via combinations of hardware and software) to perform the power management operations discussed below (i.e., in addition to conventional system management firmware functionality performed by the system management firmware 306). For instance, PSUs, such as PSU 304A and PSU 304B as well as PSU 304C and PSU 304D may be coupled in pairs and configured to operate according to load sharing constraints. For example, PSU 304A and PSU 304B may be configured to provide power to server device 300 at equal amounts (e.g., 500 W each), and the same may be true of PSU 304C and PSU 304D. In some cases, power management firmware 308, running on power controller 308A, may be configured to reduce or eliminate load sharing errors, as discussed in more detail below.

Power controller 308A is coupled to each of PSUs 304A-304D via coupling(s) 309 between power controller 308A and PSUs 304A-304B, as well as to server components 310 that are housed in chassis 302 via coupling(s) 311 between power controller 308A and server components 310. For example, couplings 309 and/or 311 may be provided by one or more digital bus systems or analog control signals. In an embodiment, server components 310 may include processing systems (not illustrated, but which may include processor(s) 101 discussed above with reference to FIG. 1), memory systems (not illustrated, but which may include memory 114 discussed above with reference to FIG. 1), networking systems, and/or any other server components. Power controller 308A is also coupled to a storage device (e.g., storage device 108 discussed above with reference to FIG. 1) housed in chassis 302 and that includes power management policy database 312 configured to store any of the information utilized by the power management subsystem 306.

Chassis 302 may also house communication system 316 coupled to power controller 308A in power management subsystem 306, and that may include a Network Interface Controller (NIC), a wireless communication subsystem (e.g., a BLUETOOTH® communication subsystem, a Near Field Communication (NFC) subsystem, a WiFi communication subsystem, etc.), and/or other wireless communication components. As illustrated, communication system 316 may be coupled (e.g., via an Ethernet connection) to a network 318 that may be provided by a Local Area Network (LAN), the Internet, and/or other networks, and administrator device 320 (e.g., a desktop computing device, a laptop/notebook computing device, a tablet computing device, a mobile phone, etc.) may be coupled to network 318 as well to allow the communications between administrator device 320 and server device 300.

Figure 4:
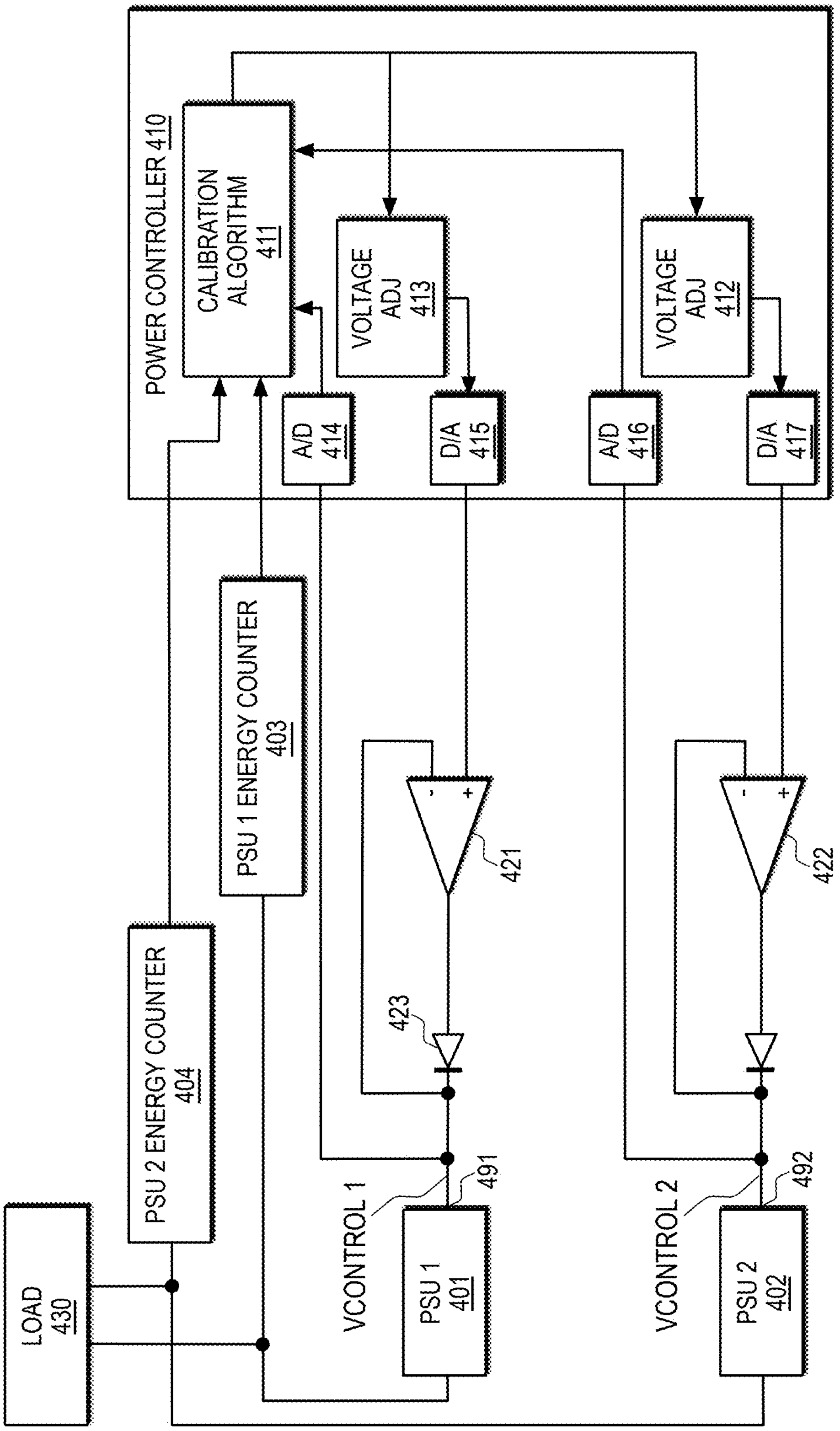
FIG. 4 is a diagram illustrating an example of a system for controlling power supply units (PSUs), according to various embodiments.

FIG. 4 is an illustration of an example system 400 system for controlling PSUs, according to various embodiments. System 400 includes PSU 401 and PSU 402, which may be paired in a load sharing arrangement. For instance, PSU 401 and PSU 402 may be configured to provide equal power to load 430 (e.g., 500 W each). In system 400, PSU 401 and PSU 402 may be representative of the various PSUs described above with respect to FIGS. 2 and 3. Furthermore, load 430 may be illustrative of IHS 100, any of server devices 216-220, or server device 300 (FIGS. 1-3), a data storage device, a networking device, or the like.

System 400 further includes power controller 410, which may be illustrative of power controller 308A of FIG. 3. For instance, power controller 410 may be implemented as a BMC or other appropriate processing device and configured to run computer-executable code (software or firmware) to provide the operations described below. In various embodiments, components of system 400 may be arranged in a feedback loop.

Particularly, energy counter 403 may be coupled to an output of PSU 401, and energy counter 404 may be coupled to an output of PSU 402. For instance, PSU 401 and PSU 402 may be configured to provide power to load 430, and each of energy counters 403, 404 may tap output lines to measure, e.g., voltage and current over time. In the present example, energy counters 403 and 404 may include transducers to measure energy, as well as analog-to-digital converters, so that energy counters 403 and 404 may provide digital output to the power controller 410. The digital output is indicative of the energy measurements at energy counters 403 and 404, and the digital output may be provided to calibration algorithm 411. Calibration algorithm 411 may be implemented with computer-executable code (e.g., firmware or software) that is executed by power controller 410.

Each of PSUs 401 and 402 receives a respective analog voltage control signal Vcontrol 1 and Vcontrol 2 at their control pins 491, 492. In one example, a voltage level of 5 V of either of the voltage control signals may be, at least nominally, configured to cause each of PSUs 401 and 402 to output 500 W. Thus, PSUs 401 and 402 may be configured to provide a total of 1000 W to load 430. Continuing with the example, a voltage level of 4 V may be configured to cause each of PSUs 401 and 402 to output 400 W. In other words, there may be a linear relationship between the voltage level of Vcontrol 1 and Vcontrol 2 and the power outputs of each of PSU 401 and PSU 402.

Analog voltage control signals Vcontrol 1 and Vcontrol 2 may be any signal capable of conveying voltage control signaling information, and it may be an implementation of a standard voltage control signal, such as the Ishare signal provided by OCP M-CRPS. However, the scope of embodiments is not limited to any particular signal or standard.

Calibration algorithm 411 receives a measurement of a voltage level of Vcontrol 1 through analog-to-digital converter 414 and receives a measurement of a voltage level of Vcontrol 2 through analog-to-digital converter 416. Calibration algorithm 411 may control a level of Vcontrol 1 by sending a digital signal to digital voltage adjustment circuit 413, which outputs a digital value to digital-to-analog converter 415. Similarly, calibration algorithm 411 may control a level of Vcontrol 2 by sending another digital signal to digital voltage adjustment circuit 412, which outputs a digital value to digital-to-analog converter 417.

Digital-to-analog converter 415 may translate its received digital value into an analog voltage level, which it applies to a noninverting input (+) of amplifier 421. Similarly, digital-to-analog converter 417 may translate its received digital value into an analog voltage level, which applies to a noninverting input of amplifier 422.

Amplifier 421 may receive a voltage level at its noninverting input, and when that voltage level is higher than the voltage level of Vcontrol 1 (at the inverting input), then the output of the amplifier 421 increases, thereby increasing the voltage level of Vcontrol 1. However, if the voltage level at the noninverting input is lower than the voltage level of Vcontrol 1, then the diode in amplifier 421 prevents a lower voltage from being output by amplifier 421, which may result in a floating voltage for Vcontrol 1. (Amplifier 422 works similarly.)

In one example, PSU 401 outputs 500 W and receives 5 V and its control pin 491 as analog control voltage Vcontrol 1. Continuing with the example, PSU 402 may output 490 W while receiving 5 V as Vcontrol 2 at its control pin 492. However, system 400 may include a load sharing configuration of PSU 401 and PSU 402 in which both PSUs are expected to provide 1000 total watts of power at a given time. In this example, system 400 is losing out on 10 W of power and is thus experiencing a performance shortfall commensurate with the 10 W of power.

Energy counters 403 and 404, respectively, measure PSU 401 outputting 500 W and measure PSU 402 outputting 490 W. The measurements from energy counters 403, 404 are input to calibration algorithm 411. Calibration algorithm 411 may then perform a method to tune out the error. An example method includes measuring a pin voltage at the control pin 492 of PSU 402, where the pin voltage is a measurement of the voltage level of Vcontrol 2 (in this example, 5 V). Calibration algorithm 411 also has data from energy counter 404 indicating that the power output of PSU 402 is 490 W.

Calibration algorithm 411 may then calculate an expected value for the pin voltage based on the power output of PSU 404. Assuming a linear relationship between voltage level of Vcontrol 2 and energy detected at energy counter 404, the expected pin voltage would be 4.9 V. Thus, there is an error of 0.1 V (2%). Calibration algorithm 411 may then raise the voltage level of Vcontrol 2 by multiplying its value by 1.02, which would provide a voltage level of Vcontrol 2 of 5.1 V.

In an example, digital voltage adjustment circuits 412 and 413 may be digital multiplier/divider circuits. Calibration algorithm 411 may provide a digital signal to voltage adjustment circuit 412, where the digital signal indicates a magnitude of the error of 1.02. The voltage adjustment circuit 413 then multiplies its stored value by 1.02, outputs the new digital value to digital-to-analog converter 417, which in turn causes the voltage level of Vcontrol 2 to increase to 5.1 V. In this example, Vcontrol 1 would remain at 5 V, and Vcontrol 2 would be adjusted to 5.1 V. In other words, the Vcontrol voltage levels may be unique for each of the PSUs 401 and 402. In another example in which PSU 401 outputs a power that is lower than its faceplate limit or program to limit, calibration algorithm 411 may use voltage adjustment circuit 413 and digital-to-analog converter 414 similarly to control the voltage level of Vcontrol 1.

In some systems, it may be more likely that one PSU operates at its limit, while another PSU operates below its limit. However, the scope of implementations is not so limited. Rather, the technique described with respect to system 400 may be applied to a system in which more than one PSU operates at an undesired level, whether that is above or below its faceplate limit or programmed limit. Additionally, various implementations may allow for iterative adjustment, so that the power controller 410 may perform the measurement and adjustment for either or both of PSUs 401 and 402 multiple times and over a period of time as appropriate.

Furthermore, real-world systems include errors, and it is understood that even with adjustment of the Vcontrol signals, either one or both of PSUs 401 and 402 may deviate somewhat from 500 W. The technique described with respect to system 400 may allow the error to be identified and adjusted to within an acceptable range. In some cases, as long as the various hardware allows, the range may be one or two orders of magnitude below the prescribed 2% error threshold. However, the scope of implementations is not limited to any error threshold.

Figure 5:
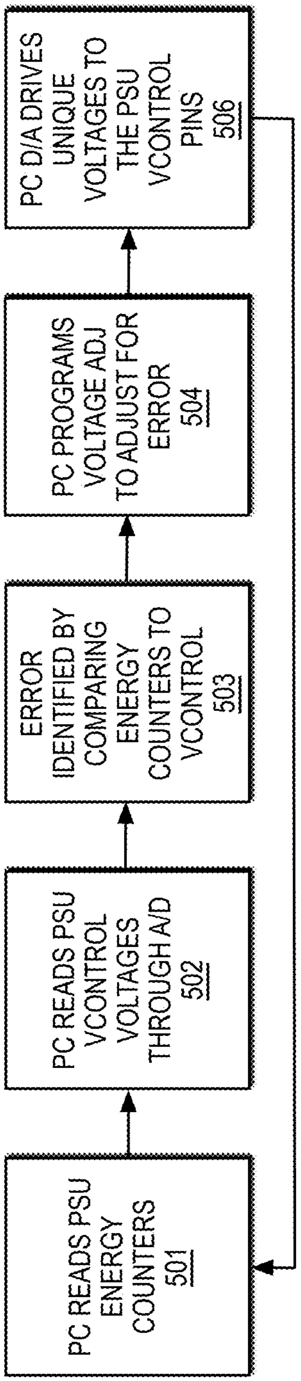
FIG. 5 is a flowchart illustrating an example of a method for controlling a PSU, according to various embodiments.

FIG. 5 is an illustration of an example of method 500 for controlling a PSU. In various embodiments, method 500 may be performed by a processor, such as a BMC, or a power controller, as described with respect to FIG. 4.

At 501, the power controller reads the energy counters. At 502, the power controller reads the Vcontrol voltages through analog-to-digital converters. An example is shown in FIG. 4, in which power controller 410 reads a voltage level of Vcontrol 1 through analog-to-digital converter 414 and reads a voltage level of Vcontrol 2 through analog-to-digital converter 416.

At 503, the power controller identifies an error by comparing the energy counter values to the Vcontrol values. In this example, an energy counter value may be related to a Vcontrol value by a function attributable to the associated PSU. As noted before, one way to do the comparison is to calculate an expected value for a measured energy counter value. In the example above, the expected pin voltage value would be 4.9 V versus the measured value of 5.0 V, for an error of 2%.

At 504, the power controller programs a voltage adjustment circuit to correct the error. At 505, the power controller causes digital-to-analog converters to drive unique voltages to the PSU Vcontrol pins. For instance, the voltage level for Vcontrol 1 may be different from the voltage level for Vcontrol 2, even though either or both of PSU 401 and PSU 402 to have been adjusted to reduce error and be substantially at their configured power limits.

In the example of FIG. 5, operation 505 then loops back to 501, thereby indicating that method 500 may be performed multiple times as appropriate. For instance, method 500 may be performed periodically, for a set number of times (e.g., three times), when either a Vcontrol voltage level is determined to be outside of a preferred range or a measured energy is determined to be outside of a preferred range, or the like.

Figure 6:
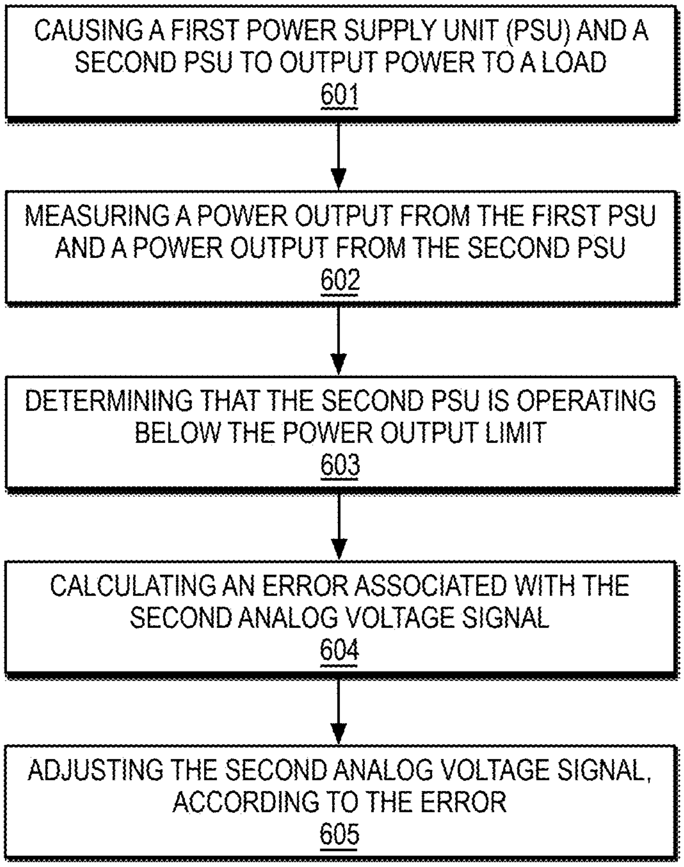
FIG. 6 is a flowchart illustrating an example of a method for correcting a load sharing error, according to various embodiments.

FIG. 6 is an illustration of an example of method 600 for correcting a load sharing error. In some embodiments, method 600 may be performed by a processor, such as a BMC, or a power controller as it executes computer-readable code to reduce or eliminate an error in performance of a PSU.

At 601, method 600 includes causing a first PSU and a second PSU to output power to a load. In an example, the first PSU and the second PSU may each be subject to a power output limit. Thus, action 601 may include outputting a first analog voltage signal to the first PSU at a first level (e.g., 5 V) corresponding to the power output limit (e.g., 500 W) and outputting a second analog voltage signal to the second PSU at the first level (e.g., 5 V).

At 602, method 600 includes measuring a power output from the first PSU and the power output from the second PSU. In the example of FIG. 4, energy counters 403 and 404 are used to measure power output. For instance, power is energy per unit time, and each of the energy counters 403 and 404 may output information sufficient for power controller 410 to determine energy per unit time supplied by each of the PSUs 401 and 402.

At 603, method 60 includes determining that the second PSU is operating below the power output limit. In the example above, the power output limit is 500 W, whereas PSU 402 operated at 490 W.

At 604, method 600 includes calculating an error associated with the second analog voltage signal. In the example above, a 5 V value for the analog voltage signal would be expected to cause the second PSU to output 500 W. However, the power measurement and the voltage measurement allow the power controller to determine that the 5 V value for the analog voltage signal results in a 490 W output for the second PSU. Therefore, the error associated with the second analog voltage signal is that it results in a 2% error at the output of the PSU.

At 605, method 600 includes adjusting the second analog voltage signal, according to the error. An example is given above with respect to FIG. 4, in which calibration algorithm 411 causes voltage adjustment circuit 412 to multiply a stored digital value by the magnitude of the error (e.g., 1.02) to result in an increase in the value of Vcontrol 2.

It should be noted that the scope of implementations is not limited to the series of operations of methods 500 and 600. Rather, the scope of implementations may include adding, omitting, rearranging, or modifying various operations. For instance, some embodiments may include measuring and reducing an error on the first PSU additionally to, or instead of, measuring and reducing an error on the second PSU. Additionally, methods 500 and/or 600 may be performed multiple times to iteratively reduce an error or to reduce an error that may change over time.

Also, while the examples above include PSUs that are paired and subject to a load sharing arrangement, the scope of embodiments may include adjusting power errors in PSUs that are in other arrangements. For instance, some implementations may include more than two PSUs, which are grouped and subject to a load sharing arrangement. The principles described above may be used just as well with three PSUs, four PSUs, or more. As such, systems and methods described herein may also be used with a single PSU to cause that PSU to operate at the desired level.

In various embodiments, systems and methods described herein further introduce a method for enabling multi-PSU systems to share input current asymmetrically, allowing for increased power and performance within power infrastructures that have varied power delivery capabilities. This may be achieved by introducing the concept of asymmetric Input Current Limits (ICLs), where each PSU in a multi-PSU system may have different input current limits. This allows the system to utilize the maximum available power from each grid without exceeding the independent input current limits of each PSU.

In various embodiments, systems and methods described herein may include a unique closed-loop algorithm that dynamically adjusts the current sharing between PSUs based on their respective ICLs. This algorithm ensures that a system can operate at full performance by reallocating stranded power from one grid to another, thereby minimizing throttling and preventing circuit trips.

In some cases, systems described herein may have three distinct operating states: balanced (50/50), where the load is equally shared between PSUs; asymmetric non-throttling, where the load is shared asymmetrically without throttling; and asymmetric throttling, where the load is shared asymmetrically with throttling to prevent exceeding ICLs. Additionally, or alternatively, systems and methods described herein may leverage circuit 400 (including methods 500 and 600) to enforce the asymmetric limits and a feedback loop to enable the PSUs to share current asymmetrically. This fine-tuning may ensure that the system can adapt to varying power delivery capabilities and maintain optimal performance.

As such, systems and methods described herein address a significant infrastructure problem by allowing the system to operate each PSU at the limit of the power delivery infrastructure connected to it, rather than being constrained by the lowest limit of any PSU. This may result in increased performance and efficiency, especially in power-constrained environments.

Figure 7:
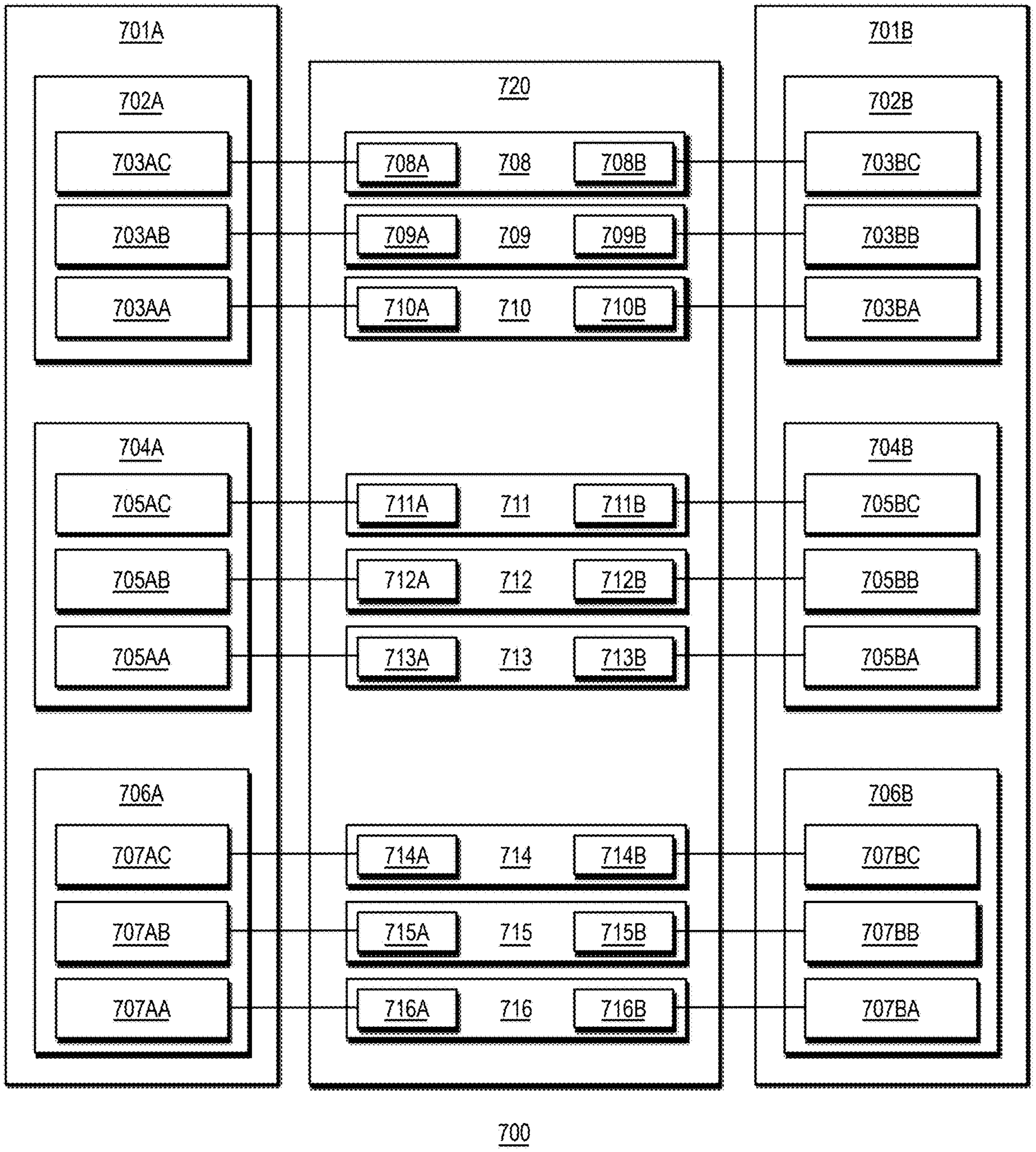
FIG. 7 is a diagram illustrating an example of a system for applying asymmetric Input Current Limits in a redundant power distribution system, according to some embodiments.

To illustrate the foregoing, FIG. 7 is a diagram illustrating an example of system 700 for applying asymmetric ICLs. As shown, servers 708-716 are coupled to rack 720. Each server 708-716 includes a respective first PSU 708A-716A and a respective second, redundant PSU 708B-716B. Rack 720 includes two grids or power distribution paths 701A and 701B. Path 701A includes phases 702A, 704A, and 706A; whereas path 701B includes phases 702B, 704B, and 706B. Phase 702A includes power outlets 703AA-AC, phase 704A includes power outlets 704AA-AC, and phase 706A includes power outlets 707AA-AC. Meanwhile, phase 702B includes power outlets 703BA-BC, phase 704B includes power outlets 704BA-BC, and phase 706B includes power outlets 707BA-BC.

It should be noted that system 700 is shown for the sake of illustration, and many variations are within the scope of the systems and methods described herein. In other implementations, for example, any number of grids (greater than two), phases, and outlets per phase may be used. Also, servers 708-716 may have any number of PSUs 708A-716A and redundant PSUs 708B-716B.

As noted above, in power-constrained environments, a failure of a server PSU combined with the activation of ICL limits can result in the system being throttled to operate within those limits. Although power remains available to mitigate throttling, there is currently no feature to harness this stranded power. This issue is particularly significant in highly power-limited data centers where power over-subscription is employed to enhance rack computing density.

To illustrate this, assume system 700 includes redundant 480 Vac three-phase 30A PDUs 701A and 701B, each providing 10 A per phase (e.g., phases 702A and 702B, respectively) with three outlets (e.g., 703AA-AC) per phase (e.g., phase 702A). In that case, servers 708-710 are equipped with redundant PSUs, each server consuming 1,662 W. Each server (e.g., 710) connects a first PSU (e.g., 710A) to Grid A (e.g., 701A), and a second, redundant PSU (e.g., 710B) to Grid B (e.g., 702B), resulting in a total load of 18 A per 277 Vac phase. In this case, redundant PDUs are over-subscribed by a factor of 1.8×, calculated as 18A load divided by the 10 A capacity of each PDU.

Under normal conditions, the 6 A load of each server 708-710 is balanced evenly across PSUs 708A-710A and 708B-710B, with each PSU drawing 3 A. A BMC may set ICL limits to 3A per PSU input from both Grid A and Grid B. This configuration ensures that the ICL feature protects the PDU circuit in the event of a PSU failure within a server platform, and it protects the PDU in another PDU fails.

When server 710's PSU 710B connected to outlet 703BA of phase 702B in PDU 701B fails, however, server 710's entire 6 A load shifts to PSU 710A, which is connected to outlet 703AA of phase 702A of PDU 701A. As a result, the ICL protection mechanism is activated, throttling server 710's load to a total of 3 A.

In the absence of ICL protection, the combined load of 3 A, 3 A, and 6 A—totaling 12 A—on phase 702A of PDU 701A circuit would exceed its 10 A capacity, causing the circuit to trip. Consequently, server 710 would go offline. The two other servers 708 and 709 on phase 702A of PDU 701A would then fail over to phase 702B of PDU 701B. However, this failover would result in a total load of 6 A, 6 A, and 0 A—again exceeding the 10 A capacity of phase 702B of PDU 701B, causing it to trip as well. This cascade would result in the two servers 708 and 709 that failed over to phase 702B of PDU 701B also going offline.

Moreover, with PDUs 701A and 701B now only carrying loads on two of their three phases, a phase imbalance occurs, introducing potential power distribution resiliency issues. Since the three-phase inputs to the PDUs are branch circuits originating from a primary circuit, this phase imbalance can adversely impact the resiliency of the primary circuit as well. As a result, when a server 710's PSU 710B connected to phase 702B of PDU 701B fails, the server's load is throttled from 6 A to 3 A until the failed PSU (or the entire server) is replaced. Meanwhile, the PDU 701A to which the failed PSU is connected has 4 A of available capacity that remains stranded and unused.

To address these concerns, systems and methods described herein may enable asymmetric current sharing between PSUs connected to different grids. In some cases, one grid with a higher input current limit can supply more power than another grid with a lower input current limit, allowing for optimized power delivery up to 100% of the total available power without exceeding the independent current limits of each grid.

In some embodiments, asymmetric ICLs may be set for Grid A and Grid B, (with the possibility of extending the solution to systems with more than two grids), such that one grid (e.g., Grid B) has a higher limit than the other (e.g., Grid A). A closed-loop control system may be implemented to enable both grids to operate at their respective ICL limits. In this case, the system may support at least three operating states: (A) balanced (50/50), where there may be equal power distribution between the grids; (B) asymmetric non-throttling, where there may be unequal power distribution without throttling, utilizing the higher ICL of one grid; and (C) asymmetric throttling, where there may be unequal power distribution with throttling applied to maintain limits.

In other embodiments, a fixed power delivery ratio may be used for Grid A and Grid B, which can also be extended to systems with more than two grids. For example, with a 30 A total limit, a fixed ratio may allocate 16 A (53.3%) to Grid A, and 14 A (46.7%) to Grid B. In this case, current share limits for each grid may be calculated as:

$$\text{Current\_Share\_Limit\_Grid\_}A=\text{ICL\_Grid\_}A/(\text{ICL\_Grid\_}A+\text{ICL\_Grid\_}B);\ \text{and}$$

$$\text{Current\_Share\_Limit\_Grid\_}B=\text{ICL\_Grid\_}B/(\text{ICL\_Grid\_}A+\text{ICL\_Grid\_}B)$$

Additionally, or alternatively, other attributes may be incorporated to fine-tune the desired power delivery ratio by accounting for variations in input voltage (Vin) and PSU efficiency, for example.

Figure 8:
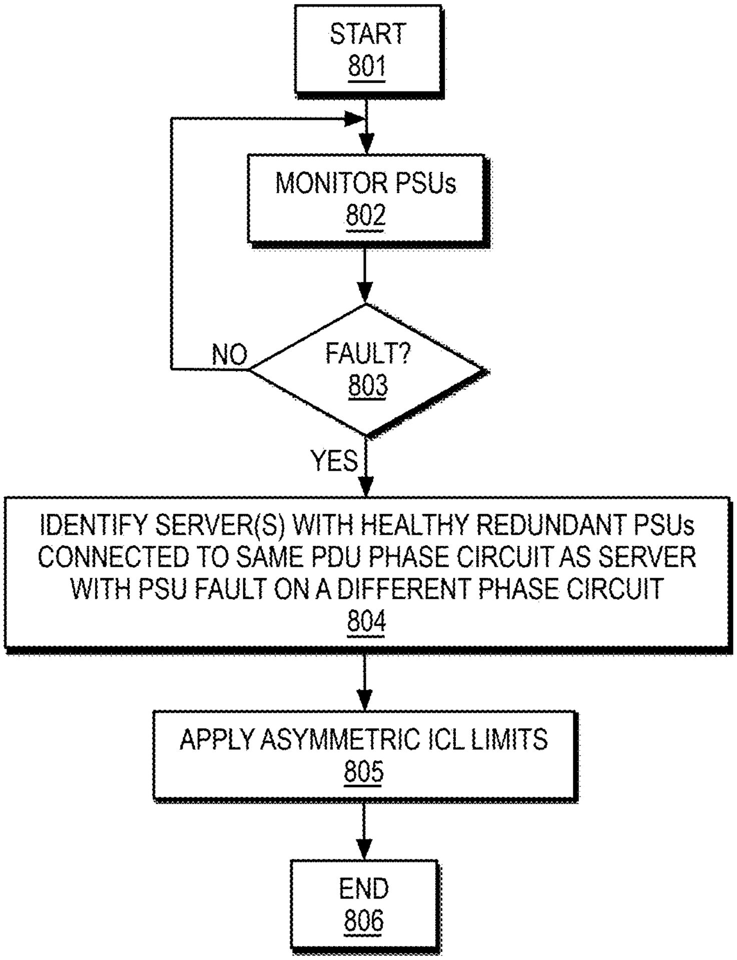
FIG. 8 is a flowchart illustrating an example of a method for applying asymmetric Input Current Limits (ICLs) in a redundant power distribution system, according to some embodiments.

FIG. 8 is a flowchart illustrating an example of method 800 for applying asymmetric ICLs in a redundant power distribution system. In various embodiments, method 800 may be performed, at least in part, by components of power management system 200 and/or servers 708-716.

Particularly, method 800 starts at 801. At 802, method 800 includes monitoring the status and/or health of a plurality of PSUs. At 803, if no fault is detected, control returns to 802. Otherwise, at 804, method 800 includes identifying server(s) with healthy redundant PSUs connected to the same PDU phase circuit as the server with the faulty PSU on a different phase circuit. In response, at 805, method 800 may apply or enforce asymmetric ICLs to the identified servers before method 800 ends at 806.

Figure 9:
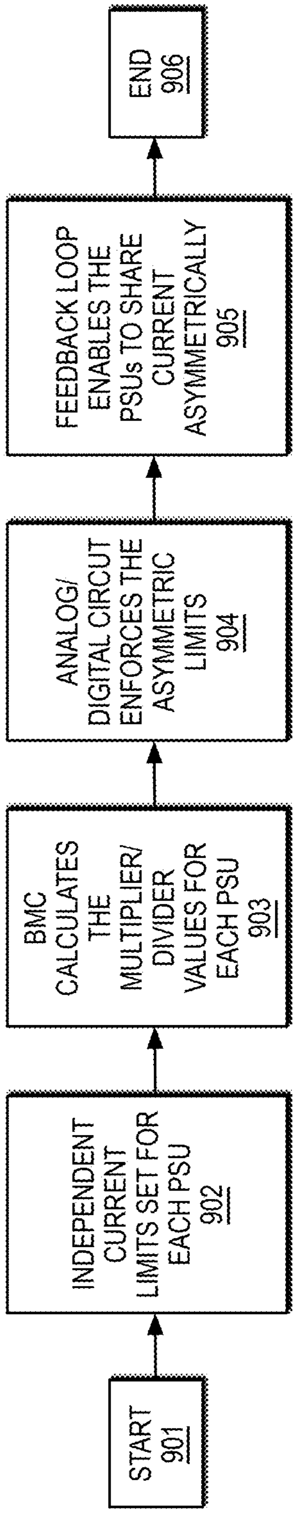
FIG. 9 is a flowchart illustrating an example of a method for enforcing asymmetric ICLs, according to some embodiments.

FIG. 9 is a flowchart illustrating an example of method 900 for enforcing asymmetric ICLs, according to some embodiments. In various embodiments, method 900 may be performed, at least in part, by components of power management system 200 and/or servers 708-716.

Specifically, method 900 starts at 901. At 902, method 900 may set independent and/or asymmetric ICLs for each PSU. At 903, method 900 may calculate a multiplier-divider value for each PSU based, at least in part, on independent and/or asymmetric ICLs. At 904, analog/digital circuitry may enforce the independent and/or asymmetric ICLs for each PSU. At 905, a feedback loop (FIG. 4) enables the PSUs to share current symmetrically. Method 900 ends at 906.

To illustrate the operation of methods 800 and 900, consider a scenario where power management system 200 detects a fault in PSU 710B and the corresponding ICL throttling event. It may also determine the available capacity that is currently not being utilized. System 200 then identifies servers 708 and 709 with healthy redundant PSUs connected to the same phase circuit 702A of PDU 701A as server 710.

The PSU load sharing for servers 708 and 709 with healthy redundant PSUs is then adjusted to utilize the previously stranded capacity on PDU 701B. Asymmetrical ICL limits are set for the two healthy servers' PSUs 708A and 709A, with 1.5 A allocated for phase 702A in PDU 701A, and 4.5 A allocated for phase 702B of PDU 701B.

Once these ICL limits are established, the load sharing between the PSUs of the two healthy servers is adjusted according to the new limits. The 3 A of available capacity on phase 702B of PDU 701B is effectively reallocated to phase 702A of PDU 701A. Additionally, the ICL limit for server 710 is set to 6 A for phase 702A of PDU 701A. As a result, all servers 708-710 are restored to full performance.

To restore the system to normal operation, faulty PSU 710B and/or server 710 may be replaced. The BMC on this new or upgraded server prevents enabling the new PSU on phase 702B of PDU 701B until the asymmetric ICL limits are reverted to their normal operation values. Without this precaution, load balancing would add 3 A to the 9 A already on phase 702B of PDU 701B, causing the circuit to trip.

Next, the ICL limit for new or upgraded server 710 is adjusted back to 3 A for PSU 710A attached to phase 702A of PDU 701A. This server may experience temporary throttling as its available power is reduced. ICL limits for the other two servers 708 and 709 are also reset to 3 A for their PSUs 708A and 709A coupled to phase 702A of PDU 701A, and PSUs 708B and 709B coupled to phase 702B of PDU 701B. During this transition, unbalanced PSU load sharing may result in brief throttling of the two healthy servers.

Subsequently, the PSU load sharing for the two healthy servers 708 and 709 is reverted to a balanced state (50/50). At this point, any temporary throttling ceases. Finally, new or upgraded server 710 with the replaced PSU 710B on phase 702B of PDU 701B is enabled, and the system resumes normal operation.

Figure 10:
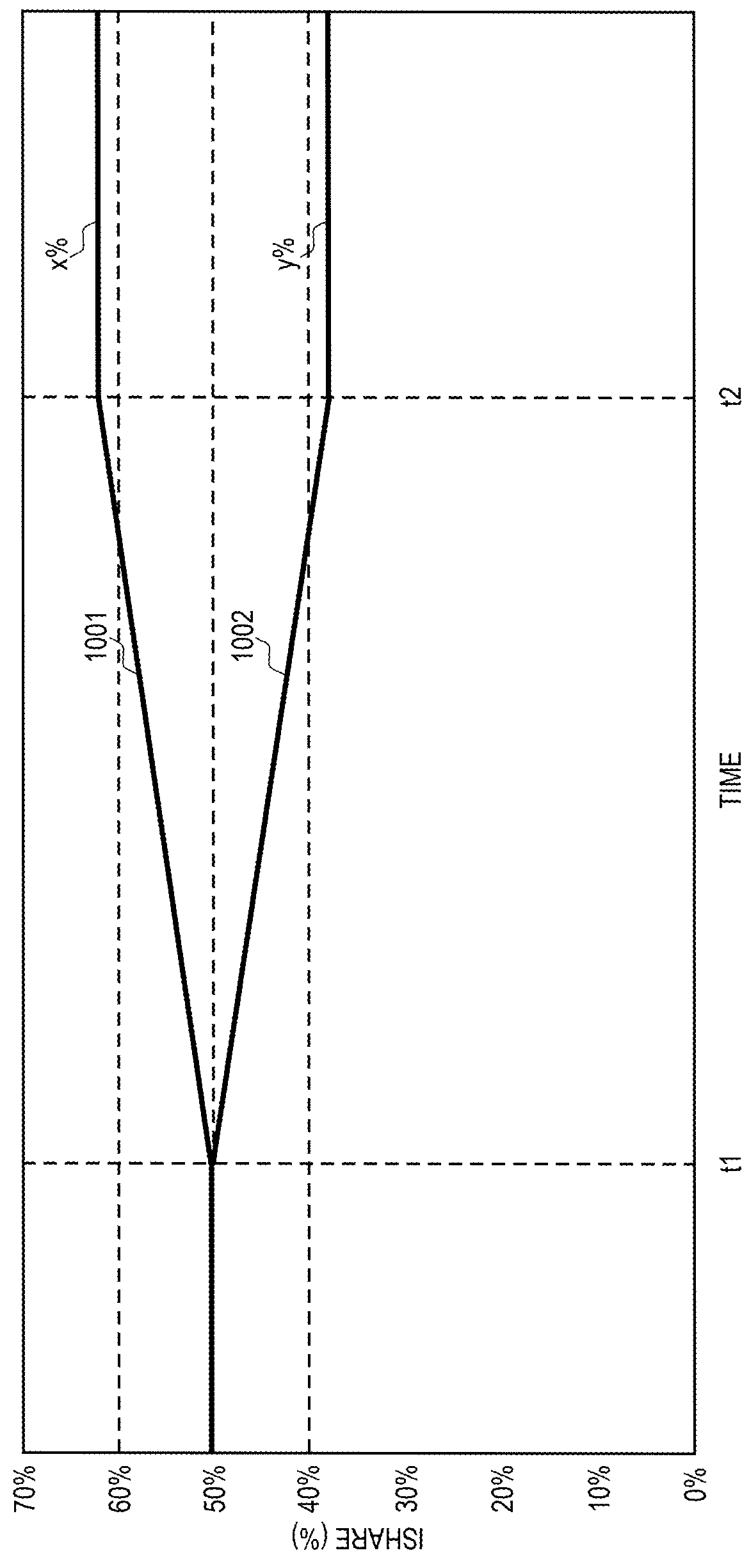
FIG. 10 is a graph illustrating an example of adaptive current sharing, according to some embodiments.

FIG. 10 shows graph 1000 illustrating an example of adaptive current sharing. In various embodiments, graph 1000 may be produced by implementing systems and methods described herein. Particularly, curve 1001 shows the Ishare signal for grid A, and curve 1002 shows the Ishare signal for grid B.

As shown in graph 1000, between t0 and t1, the system is in a balanced state, which means both grids A and B are operating below their limits. Between t1 and t2, the systems is an asymmetric, non-throttling state, such that the value of curve 1001 increases while curve 1002 decreases. After t2, the system enters an asymmetric throttling state, where the system is fully throttled, in this case, with 61% and 39% current shares for grids A and B, respectively.

Figure 11:
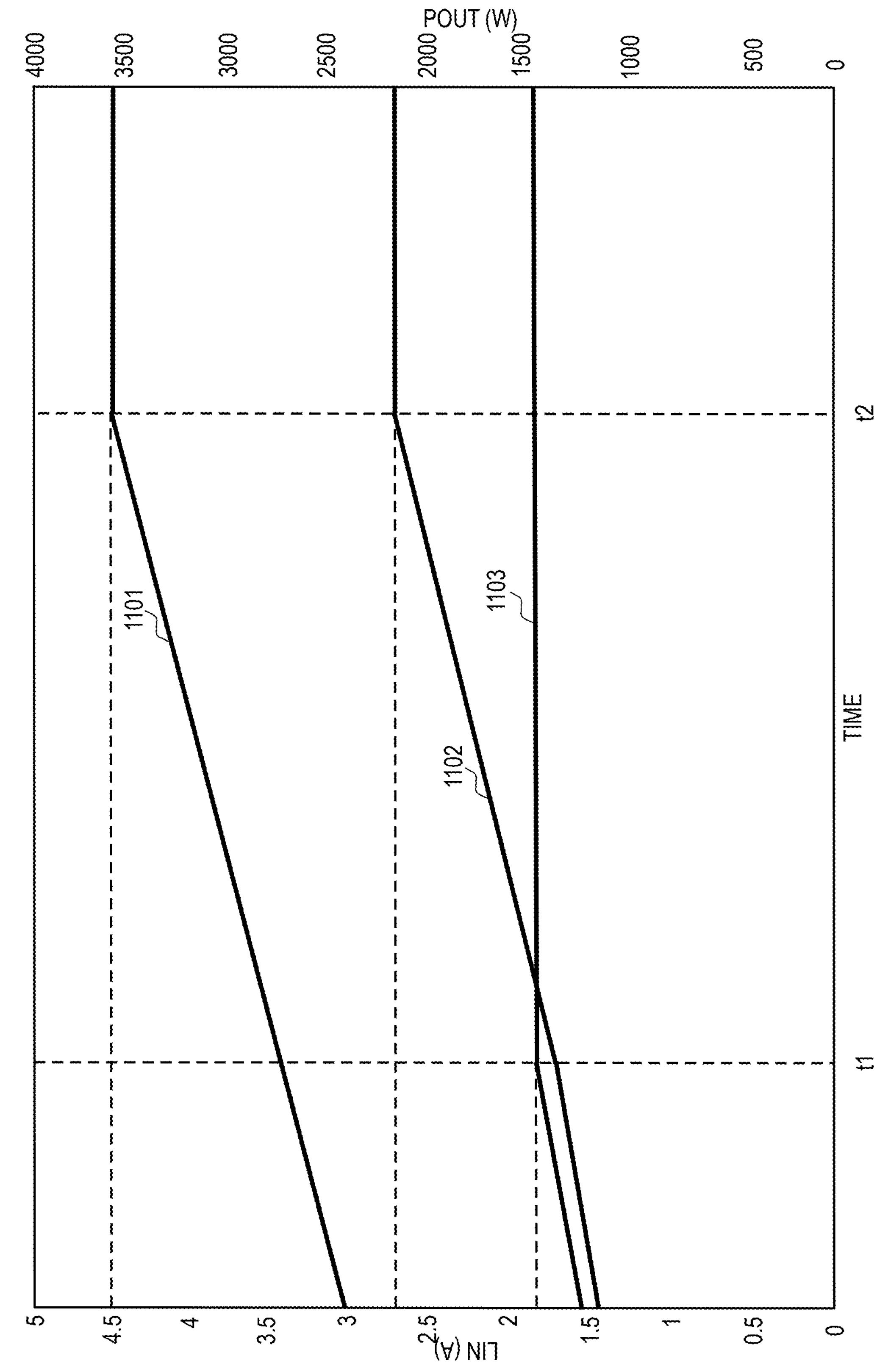
FIG. 11 is a graph illustrating an example of adaptive current sharing with unbalanced grid ICLs, according to some embodiments.

FIG. 11 shows graph 1100 illustrating an example of adaptive current sharing with unbalanced grid ICLs. In various embodiments, graph 1100 may be produced by implementing systems and methods described herein. Particularly, curve 1101 shows the system's total power consumption, curve 1102 shows grid A's current consumption, and curve 1103 shows grid B's current consumption for the example of FIG. 10.

Between t0 and t1, the system is in an unbalanced state. At t1, curve 1102 reaches the current limit for grid A, which remains at that level afterwards. Meanwhile, curve 1103 continues to rise until it reaches the current limit for grid B at t2. After t2, both curves 1102 and 1103 operate at their maximum, asymmetrical current levels.

In various implementations, the following pseudo-code may be used to implement adjustable current sharing so that the load is balanced until a first ICL is reached, as shown in FIGS. 10 and 11:

```
IshareA = 0.5
IshareB = 0.5
IoutA = Pload / Vout * IshareA
IoutB = Pload / Vout * IshareB
IinA = IoutA * Vout / EffA / VinA
IinB = IoutB * Vout / EffB / VinB
PoutTotal = Pload
If IinA > ICLA Then
  IinA = ICLA
  IinB = (Pload − IinA * VinA * EffA) / EffB / VinB
  If IinB > ICLB Then
    IinB = ICLB
  End If
  IoutA = IinA * VinA * EffA / Vout
  IoutB = IinB * VinB * EffB / Vout
ElseIf IinB > ICLB Then
  IinB = ICLB
  IinA = (Pload − IinB * VinB * EffB) / EffA / VinA
  If IinA > ICLA Then
    IinA = ICLA
  End If
  IoutA = IinA * VinA * EffA / Vout
  IoutB = IinB * VinB * EffB / Vout
End If
IshareA = IoutA / (IoutA + IoutB)
IshareB = IoutB / (IoutA + IoutB)
```

This approach provides maximum available power, and power consumption is balanced between grids when possible. In other embodiments, however, an asymmetric current sharing ratio may be fixed throughout the entire operation of the system. Such asymmetric current sharing ratio may remain unchanged whether both grids are below limits or the system is fully throttled. In that case, current sharing may be adjusted so that both grids reach their respective ICL at the same time, at the cost of power consumption being unbalanced between grids.

The Following Pseudo-Code May be Used to Implement Static Current Sharing:

$$\text{Iin\_GridA} = \text{ICL\_GridA}$$

$$\text{Iin\_GridB} = \text{ICL\_GridB}$$

$$\text{Pin\_GridA} = \text{Iin\_GridA} * \text{Vin\_GridA} / 1000$$

$$\text{Pin\_GridB} = \text{Iin\_GridB} * \text{Vin\_GridB} / 1000$$

$$\text{Pout\_GridA} = \text{Pin\_GridA} * \text{PSU\_Eff\_GridA}$$

$$\text{Pout\_GridB} = \text{Pin\_GridB} * \text{PSU\_Eff\_GridB}$$

$$\text{Iout\_GridA} = \text{Pout\_GridA} / Vout * 1000$$

$$\text{Iout\_GridB} = \text{Pout\_GridB} / Vout * 1000$$

$$IshareA = \text{Iout\_GridA}(\text{Iout\_GridA} + \text{Iout\_GridB})$$

$$IshareB = \text{Iout\_GridB}(\text{Iout\_GridA} + \text{Iout\_GridB})$$

As such, systems and methods described herein may enable multi-PSU systems to share input current equally when the input current is below the lowest PSU input current limits. Additionally, or alternatively, these systems and methods may allow for maximizing system power and performance within power infrastructures with varied power delivery capabilities. Additionally, or alternatively, these systems and methods may provide the ability to control the input current for each PSU in a multi-PSU system, either as a fixed ratio across multiple PSUs or by setting quantified input current limits for each PSU. Additionally, or alternatively, these systems and methods may improve the performance of multi-PSU systems by allowing each PSU to operate at the maximum limit of the power delivery infrastructure connected to it, rather than being constrained by existing designs that require all PSUs to operate at the lowest input current limit.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
 a processor; and
 a memory coupled to the processor, the memory having program instructions stored thereon that, upon execution, cause the IHS to:
  detect a second power supply unit (PSU) fault in a first server, the first server having a first PSU coupled to a first grid and the second PSU coupled to a second grid; and
  in response to the detection, allocate stranded power from the second grid to the first PSU following an asymmetric Input Current Limit (ICL) setting associated with the first server.

2. The IHS of claim 1, wherein prior to the detection, the first and second PSUs operate subject to symmetric load balancing.

3. The IHS of claim 1, wherein the asymmetric ICL setting comprises an ICL ratio.

4. The IHS of claim 1, wherein the stranded power comprises power available in the second grid and not consumed by the second PSU.

5. The IHS of claim 1, wherein to allocate the stranded power, the program instructions, upon execution, cause the IHS to modify power delivered to another first server having another first PSU coupled to the first grid and another second PSU coupled to the second grid.

6. The IHS of claim 5, wherein the program instructions, upon execution, cause the IHS to reduce power delivered to the another first PSU and increase power delivered to the another second PSU following another asymmetric ICL setting associated with the other first server.

7. The IHS of claim 6, wherein the program instructions, upon execution, cause the IHS to determine that: (a) the first server has received a new second PSU, or (b) the first server has been replaced by a new first server, wherein the new first server comprises a new first PSU and another new second PSU.

8. The IHS of claim 7, wherein the program instructions, upon execution, cause the IHS to prevent the new second PSU from receiving power from the second grid until the IHS reduces power delivered via the first grid to the first PSU or the first new PSU.

9. The IHS of claim 8, wherein the program instructions, upon execution, cause the IHS to throttle the first server.

10. The IHS of claim 8, wherein the program instructions, upon execution, cause the IHS to prevent the new second PSU from receiving power from the first grid until the other first server is set to symmetric load balancing.

11. A method, comprising:
 delivering power to a first server having a first power supply unit (PSU) coupled to a first grid and a second PSU coupled to a second grid, the first and second PSUs subject to symmetric load balancing;
 detecting a failure of the second PSU; and
 in response to failure, allocating stranded power from the second grid to the first PSU following an asymmetric Input Current Limit (ICL) setting.

12. The method of claim 11, wherein allocating the stranded power comprises reducing power delivered to another first PSU and increasing power delivered to another second PSU of another first server, wherein the another first PSU is coupled to the first grid and the another second PSU is coupled to the second grid.

13. The method of claim 12, further comprising:
 determining that: (a) the first server has received a new second PSU, or (b) the first server has been replaced by a new first server, wherein the new first server comprises a new first PSU and another new second PSU; and
 preventing the new second PSU from receiving power from the second grid until the IHS reduces power delivered via the first grid to the another first PSU or the new first PSU.

14. The method of claim 13, further comprising throttling the first server.

15. The method of claim 13, further comprising preventing the replaced first PSU or the new first PSU to receive power from the first grid until the other first server returns to the symmetric load balancing.

16. A hardware memory device having program instructions stored thereon that, upon execution by a processor of an Information Handling System (IHS), cause the IHS to:
 deliver power to a first server having a first power supply unit (PSU) coupled to a first grid and a second PSU coupled to a second grid, the first and second PSUs subject to symmetric load balancing;
 detect a failure of the second PSU; and
 in response to failure, allocate stranded power from the second grid to the first PSU following an asymmetric Input Current Limit (ICL) setting.

17. The hardware memory device of claim 16, wherein to allocate the stranded power, the program instructions, upon execution, cause the IHS to reduce power delivered to another first PSU and increase power delivered to another second PSU of another first server, wherein the another first PSU is coupled to the first grid and the another second PSU is coupled to the second grid.

18. The hardware memory device of claim 16, wherein the program instructions, upon execution, cause the IHS to:
 determine that: (a) the first server has received a new second PSU, or (b) the first server has been replaced by a new first server, wherein the new first server comprises a new first PSU and another new second PSU; and
 prevent the new second PSU from receiving power from the second grid until the IHS reduces power delivered via the first grid to the another first PSU or the new first PSU.

19. The hardware memory device of claim 16, wherein the program instructions, upon execution, cause the IHS to throttle the first server.

20. The hardware memory device of claim 16, wherein the program instructions, upon execution, cause the IHS to prevent the replaced first PSU or the new first PSU to receive power from the first grid until the other first server returns to the symmetric load balancing.

* * * * *